United States Patent

[11] 3,596,167

| [72] | Inventor | Harald A. Enge<br>Winchester, Mass. |
| [21] | Appl. No | 850,051 |
| [22] | Filed | Aug. 14, 1969 |
| [45] | Patented | July 27, 1971 |
| [73] | Assignee | Deltaray Corporation<br>Winchester, Mass. |

[54] CASCADE TRANSFORMER HIGH VOLTAGE GENERATOR
12 Claims, 13 Drawing Figs.

[52] U.S. Cl.............................................. 321/15,
321/27, 323/44, 323/61
[51] Int. Cl................................................ H02m 7/00
[50] Field of Search............................................ 321/15, 27;
323/44, 60, 61

[56] References Cited
UNITED STATES PATENTS
3,008,079  11/1961  Scott............................ 321/27

| 3,092,769 | 6/1963 | Miller......................... | 321/27 X |
| 3,334,289 | 8/1967 | Chumakov.................. | 321/27 X |
| 3,412,310 | 11/1968 | Quinn......................... | 321/15 |
| 3,445,753 | 5/1969 | Maxwell..................... | 323/43.5 |

*Primary Examiner*—William M. Shoop, Jr.
*Attorney*—Roberts, Cushman and Grover

ABSTRACT: A cascade transformer configuration for generating high DC voltages wherein a preferred embodiment uses nonmagnetic core transformer units, the secondary coils of which are capacitively coupled to the primary coils of adjacent units. The capacitance values are selected so as to provide resonance conditions so that rectifier-multiplier chains connected to each pair of capacitively coupled coils produce DC voltages with the least loss of power. Each pair of capacitively coupled coils can be formed as an integral deck unit and such deck units stacked in a column with their rectified voltages connected in series to produce a high DC voltage output having a uniform DC voltage gradient along the column.

Inventor
Harald A. Enge
by Roberts, Cushman & Grover
Attys

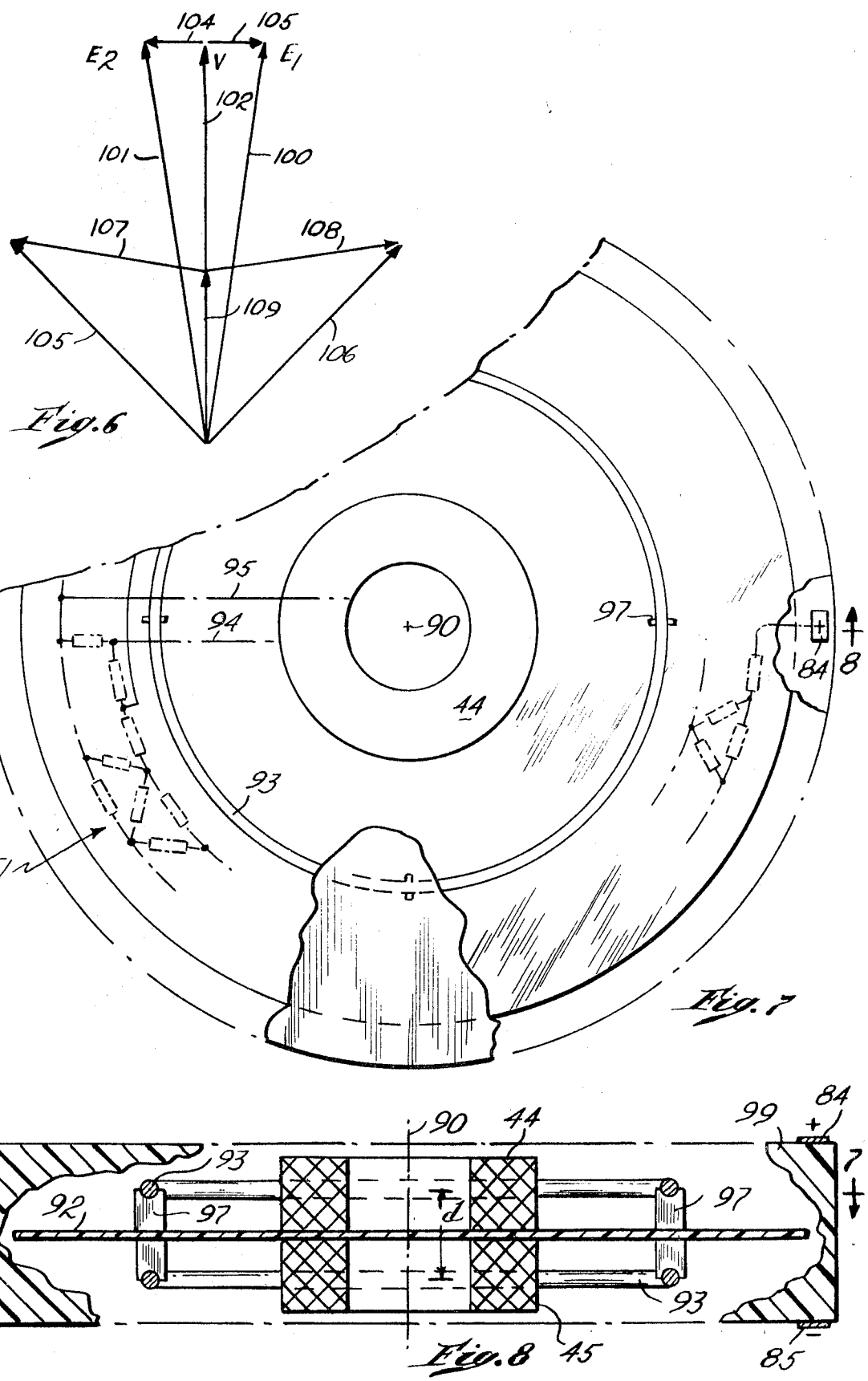

3,596,167

CASCADE TRANSFORMER HIGH VOLTAGE GENERATOR

This invention relates generally to the generation of high voltage and, more particularly, to a device which utilizes a unique cascade transformer configuration for such purpose.

High voltage generators, that is, devices for producing voltages which may lie in a range from several hundred to several thousand kilovolts, find an ever increasing number of applications in various fields of technology. For example, the demand for the use of high voltage sources in providing radiation power, such as cathode rays and X-rays, and in nuclear physics for accelerators, for example, represent a few typical applications. Moreover, the need for both higher voltages and higher current outputs is becoming more apparent.

Conventional high voltages sources which have been used in the past, such as belt-type electrostatic generators of the Van de Graaff type, provide only limited current outputs and are not always adaptable for higher performance needs. Other electromechanical devices of the electromagnetic type which may utilize, for example a plurality of stators, together with a plurality of rotors, or a common insulating shaft have been suggested, but have several severe drawbacks.

Still other types of high voltage generators which use either an air core or an insulated ferromagnetic core transformer having a common primary coil assembly and a plurality of secondary coil assemblies linking the common magnetic flux are not readily adaptable to produce voltages much above 300 kv.

A relatively recent innovation described in my previously filed patent application Ser. No. 659,742, filed Aug. 10, 1967, utilizes an electromagnetic generator wherein the power is transmitted up through a high voltage column by means of a traveling wave. One drawback with this device is that it must be terminated with its characteristic impedance to avoid standing waves which normally will produce a nonuniform gradient in the high voltage column. Means to circumvent this problem have been suggested, one such means being disclosed in my previously filed patent application, Ser. No. 792,306, filed Jan. 21, 1969.

The present invention provides a device for producing high DC voltages and of desired high power, with a large and uniform voltage gradient along the column. The device does not have the drawback of the traveling wave generator and needs capacitors with less volt-ampere rating than the traveling wave generator. Consequently, the cost per unit power is reduced considerably relative to the cost of present day devices.

The generation of such high voltages is accomplished in accordance with the invention by utilizing a cascade transformer having a unique configuration and, particularly, a preferred version thereof using a nonmagnetic core cascade transformer configuration as described in more detail below.

Ordinary cascade transformers as presently known cannot be utilized for this purpose since the leakage inductance and the magnetizing inductance of such conventional cascade transformers cause severe voltage attenuation when a long chain of such transformers is employed. In order to overcome the deficiencies of ordinary cascade transformer operation in relatively long chains, adjacent transformers in the cascade configuration of this invention are coupled through a suitable capacitance network which produces resonance conditions so that the overall attenuation is substantially decreased. Although not necessarily limited thereto, in a preferred embodiment of such a capacitance-coupled cascade transformer configuration, a nonmagnetic core as opposed to a core of magnetic material, is found to be most advantageous and provides the most significant improvement in voltage gradient per unit length of such a cascaded column.

By utilizing a nonmagnetic core cascade transformer having appropriate resonance conditions determined by the coupling capacitance, the self-inductance of each coil and the mutual inductance between a pair of adjacent coils, a maximization of power delivered to a load can be achieved, the currents within the system being limited only by the heating effects which arise within the transformer.

The unique configuration of the cascade transformer of the invention can be best explained in more detail with the aid of the accompanying drawings wherein FIGS. 1 and 1A show diagrammatic views of an ordinary cascade transformer utilizing magnetic cores and the equivalent circuit thereof;

FIG. 6 shows a vector diagram used to describe the operation of the embodiment of FIGS. 4 and 5;

FIG. 7 shows a view in cross section of a structure of decks shown diagrammatically in FIG. 5 taken along the line 7-7 in FIG. 8;

FIG. 8 shows a view in cross section taken along the line 8-8 of FIG. 7 of such deck, the high voltage column of FIG. 7.

Figure 1:
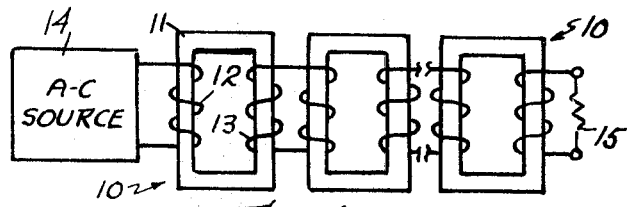

In order to better understand the operation of the present invention and to contrast it with a prior known cascade transformer configuration, FIG. 1 depicts a conventional cascade transformer utilizing a plurality of transformers 10, each having a separate iron core 11, a primary coil 12 and a secondary coil 13. Although three stages are shown, clearly more stages may be added as desired. The secondary coil of each transformer is directly connected to the primary coil of the succeeding adjacent transformer as shown. The input primary coil is connected to a source 14 of an alternating current and the output terminals from the last transformer of the chain are shown as appropriately connected to a load 15, for example.

When the device is used to produce high DC voltages a rectifier circuit of the general type, for example, shown and discussed in more detail below, may be connected to the secondary of each transformer. The load then becomes distributed along the chain of transformers resulting in a less severe voltage drop than for the case of a single equivalent load resistor 15 at the end of the chain, as shown in FIG. 1.

Figure 1A:
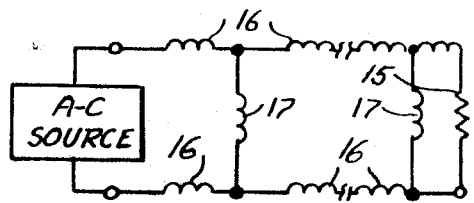

Figure 1A shows the equivalent electrical network corresponding to a portion of the cascade transformer configuration of FIG. 1. The series connected inductances 16 represent leakage inductances "$L_s$," and the parallel connected inductances 17 represent the magnetizing inductances "$L_m$." The presence of such inductances causes severe voltage attenuation, particularly when a relatively long chain of such transformers is employed so that the output voltage value is severely limited. In order to avoid such attenuation problems, the embodiments of the invention discussed with reference to FIGS. 2—8, in contrast to the conventional system of FIG. 1, may be utilized.

Figure 2:
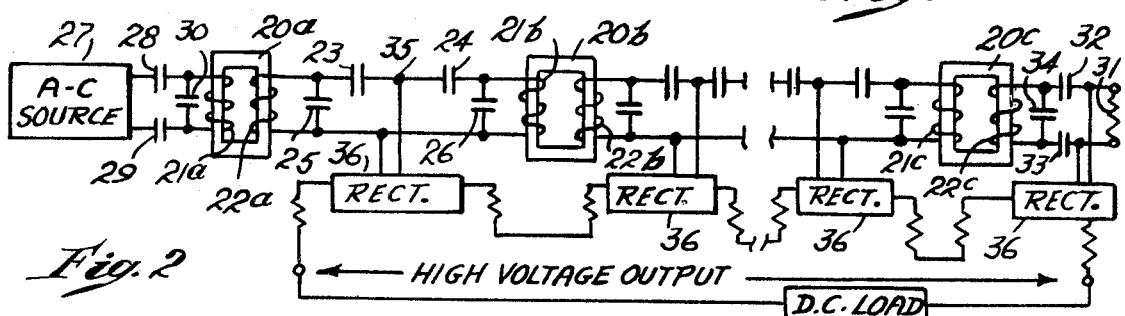
FIGS. 2 and 2A show diagrammatic views of one embodiment of a cascade transformer configuration of the invention utilizing magnetic cores and the equivalent circuit thereof.

In FIG. 2, a plurality of separate iron core units 20 of a type used in conventional magnetic core transformers may be placed adjacent one another in an appropriate chain. Each such core unit has associated therewith a primary coil 21 and a secondary coil 22. In contrast to conventional cascade transformers, however, the secondary coil of each transformer unit is capacitively coupled to the primary coil of a succeeding adjacent unit by a suitable capacitance network as shown. For example, secondary coil 22a of first transformer unit 20a has its output terminals connected to the input terminals of primary coil 21b of core unit 20b through series capacitances 23 and 24, each having a capacitance which can be represented by the term "$C_s$." A capacitance 25 is connected in parallel across secondary coil 22a and a capacitance 26 is connected across primary coil 21b, each having a capacitance which can be represented by the term "$C_p$."

An input primary coil 21a of the first core unit 20a is connected to an input source 27 of AC voltage through a capacitance network comprising a pair of series capacitors 28 and 29, each having a value of "$2C_s$," and a parallel capacitance 30 being connected across primary coil 21a and having a value of "$C_p$." Alternatively, a single series capacitor having a value "$C_s$" may be substituted for series capacitances 28 and 29. An output AC load 31 is shown as connected to the output terminals of the secondary coil 22c of the last transformer unit 20c of the chain, as so designated in the figure, through a capacitance network similar to that at the input of the chain including series capacitors 32 and 33, each having a value of "$2C_s$," and a parallel capacitor 34 having a value of "$C_p$."

The point of symmetry 35 in the capacitance coupling network and the commonly connected end points of the secondary and primary coils which are so coupled are appropriately connected to a rectifier network 36, the outputs of each of which are added serially, as shown, to provide a high DC voltage output. The rectifiers with their DC load 37 represent a distributed load on the AC circuit. In simple calculations the total load can be represented by $R_L$.

Figure 2A:
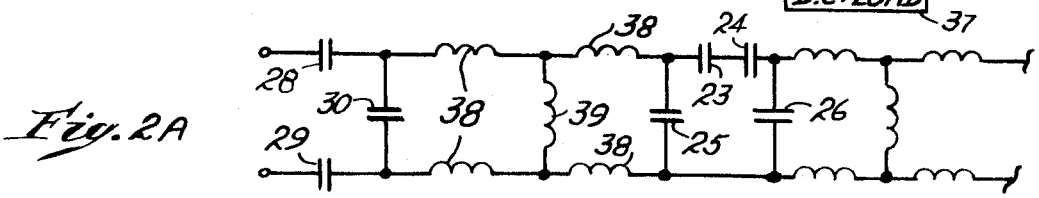

FIG. 2A shows a network electrically equivalent to a portion of the capacitance coupled, iron core cascade transformer of FIG. 2 with capacitances corresponding to those shown therein and inductances in the form of series connected inductances 38 and parallel connected inductances 39 representing the leakage inductances "$L_s$," and magnetizing inductances "$L_m$," respectively.

Figure 3:
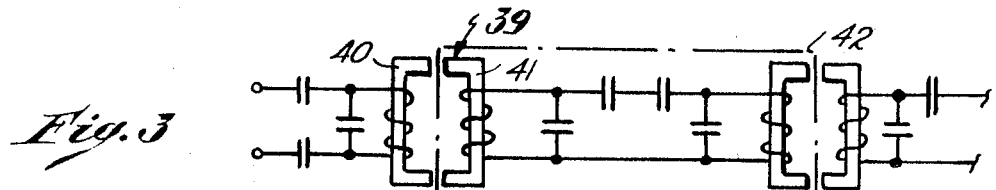
FIG. 3 shows a diagrammatic view of an alternate embodiment of the cascade transformer configuration of FIG. 2.

An alternative form of an iron or ferrite-core cascade transformer configuration in accordance with the invention is shown diagrammatically in FIG. 3. The configuration shown therein differs from that shown in FIG. 2 in that the iron or ferrite-core elements 39 are split so as to form separate portions 40 and 41 thereof having a gap therebetween associated with the primary and secondary coils of each transformer unit, respectively. Rectifier units (for clarity, not shown in FIG. 3) can be connected to the configuration of FIG. 3 in substantially the same manner as shown with reference to FIG. 2.

The combination of a secondary coil of one core element and the primary coil of the next succeeding core element, together with the capacitance coupling network therebetween and the rectifier unit associated therewith is conveniently henceforth referred to as a "deck" or "deck unit," as shown, for example, enclosed by the dot-dash line 42 in FIG. 3. In practice, for the embodiment of FIG. 3 and of FIG. 4 described below, a deck can be constructed as a single integral unit with only two external connections representing the positive and negative terminals thereof as discussed in more detail below. The decks can therefore be stacked to build up higher DC voltages in a manner analogous to the stacking of flashlight batteries. The gap between the two halves of an iron core in two adjacent decks, thus, can be formed of solid insulation material such as epoxy or other suitable compositions.

It has been found that a capacitance coupled cascade transformer configuration of the invention using iron or ferrite cores, as described with reference to FIGS. 2 and 3, may not be applicable when high power and, simultaneously, relatively high voltage gradients per unit length are required. Also, because of core losses, an iron or ferrite core transformer cannot easily be operated at as high a frequency as a nonmagnetic core transformer. Since, for a given geometry, the transportable power increases linearly with the frequency, it turns out that little or nothing may be gained by using iron or ferrite cores in many applications.

The preferred embodiment of the invention utilizes a nonmagnetic core, capacitance-coupled cascade transformer configuration. Such a nonmagnetic core cascade transformer system is shown diagrammatically in FIG. 4.

Figure 4:
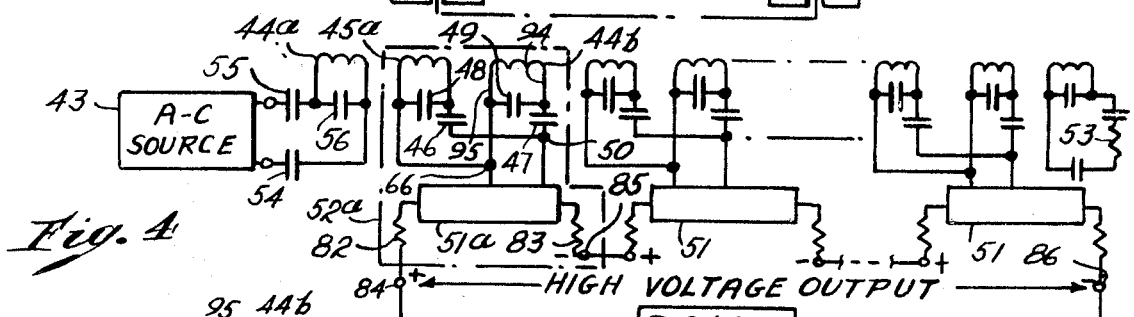
FIG. 4 shows a diagrammatic view of one preferred embodiment of the cascade transformer configuration of the invention utilizing a nonmagnetic core.

FIG. 4 depicts a plurality of cascaded transformers comprising coils which can be mounted along a common axis adjacent one another, the structural configuration of which is shown in more detail with reference to FIGS. 7 and 8. In FIG. 4 each transformer can be considered as comprising a primary coil 44 and a secondary coil 45.

Each coil has associated therewith a self-inductance "L," and between the primary coil and the secondary coil of each transformer there exists a mutual inductance "M." The secondary coil thereof is capacitively coupled to the primary coil of the succeeding adjacent unit through a capacitance coupling network of substantially the same configuration as described with reference to FIGS. 2 and 3 wherein a pair of series capacitances 46 and 47, each having a value represented by "$C_s$," are connected between such coils, a parallel capacitance 48, having a value represented by "$C_p$," is connected in parallel with the secondary coil of one transformer, and a parallel capacitance 49, also having a value represented by "$C_p$," is connected in parallel with the primary coil of an adjacent transformer.

The point of symmetry 50 of the capacitance coupling network and the commonly connected end points of the secondary and primary coils which are so coupled are appropriately connected to rectifiers 51, the outputs of which are added serially, as shown, to provide a high DC voltage output for an appropriate DC load 67. As before, the combination of the secondary coil of one unit and the primary coil of the next succeeding unit, together with the capacitance coupling network and the rectifier associated therewith is conveniently referred to as a "deck" or "deck unit" shown by dot-dash line 52, as discussed above.

As described previously with reference to FIGS. 2 and 3, an input source 43 of AC power is connected to the primary input coil 44a of the first transformer unit of the chain through a pair of series capacitances 54 and 55, each having a value represented by "$2C_s$," and a capacitance 56 connected in parallel with the input primary coil 44a, such parallel capacitance having a value represented by "$C_p$." As previously mentioned, series capacitances 54 and 55 may be replaced by a single capacitance having a value represented by $C_s$.

Unlike the capacitance-coupled cascade transformers of FIGS. 2 and 3, the system shown in FIG. 4 is additionally complicated because each primary coil links magnetically not only with its secondary coil but also with each of the other coils of the chain, although the magnitude of such coupling rapidly diminishes with the distance between the coils. In order to calculate the values of the desired capacitances utilized in this embodiment, such mutual coupling, even though rapidly diminishing, must be taken into account. A detailed calculation of the values required for such capacitances selected to provide resonance conditions in a typical case can be made in accordance with the following equations:

$$C_p = \frac{L-M}{\omega^2 L(L+M)} \quad (1)$$

$$C_s = \frac{4M}{\omega^2(L^2-M^2)} \quad (2)$$

where L is the self-inductance of any one coil and M is the mutual inductance between a pair of adjacent coils, and $\omega=2\pi f$, where f is the applied frequency. In deriving these formulas and those which follow, the assumption has been made that the mutual inductance between any one coil and any other coil in the configuration decreases exponentially with the distance between the midpoints of such one coil and such other coil. If a maximum obtainable coil current is identified as $I_1$ (it is, of course, assumed that the peak currents involved will be limited by the heating effects within the transformer as in any transformer configuration), the maximum power that can be transported to the combined AC load 53 and DC load 67, as represented by the term $R_L$, can be expressed as:

$$P = \frac{\omega M L^2 I_1^2}{L^2 - M^2} \qquad (3)$$

The combined equivalent load resistor $R_L$ is then expressed as:

$$R_L = \frac{\omega(L+M)^3}{4M(L-M)} \qquad (4)$$

Figure 5:
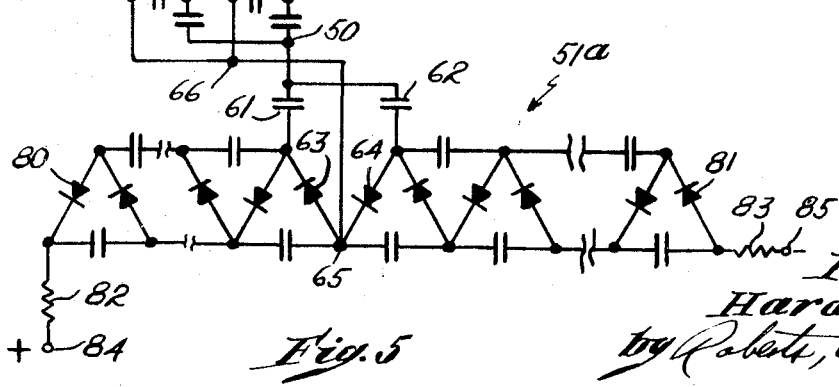
FIG. 5 shows a schematic diagram of one deck of the embodiment of FIG. 4.

In order to generate the overall DC output voltage required, a portion of the power obtainable at the symmetry point 50 of each deck 52 is bled off through an appropriate rectifier network 51, one of which, designated as rectifier 51a, shown in detail in FIG. 5 with reference to deck 52a comprising secondary coil 45a of a first transformer unit 43a and primary coil 44b of a second transformer unit in the cascaded chain of FIG. 4.

In FIG. 5, the symmetry point 50 of the capacitance coupling network is connected through a pair of capacitors 61 and 62 to a rectifier multiplier chain having a configuration represented by the well-known Cockcroff-Walton circuit, extending in opposite directions from the symmetry point. Rectifiers 80 and 81 at each end of the overall rectifier chain on either side of such symmetry point are shown as appropriately connected through output resistors 82 and 83 to terminals 84 and 85 which represent the positive and negative output terminals, respectively, of deck 52a for providing a DC voltage output therefrom.

The voltages obtained from each of the decks are connected in series as shown in FIG. 4 to produce the high DC voltage output between output terminals 84 and 86, as shown therein.

FIGS. 7 and 8 depict a preferred embodiment of the physical structure of a deck unit of the nonmagnetic core cascade transformer column configuration shown diagrammatically in FIGS. 4 and 5. FIG. 7 shows a portion of a cross section view taken along the line 7-7 of FIG. 8, and FIG. 8 shows a longitudinal cross section view taken along the line 8-8 of FIG. 7. Such a deck unit can be constructed as a single integral unit, as described below. As can be seen in these figures, the primary and secondary coils 44 and 45, respectively, are mounted substantially adjacent each other along a common axis 90. In the structure shown such coils are mounted by appropriate bonding means to an insulative plate member 92, which, for example, may be made of "Bakelite" or other suitable material. Shielding coils 93 in the form for example, of single copper rings, are appropriately mounted on insulative standoffs 97 concentrically with each coil, as shown, each such shielding ring being spaced from its associated coil by a suitable distance in order to shield the coils from any external magnetic field effects and, in turn, to shield the elements mounted at or near the periphery of the column from any magnetic effects of the coils. Such an arrangement is generally satisfactory for a low-power device utilizing relatively small coils. In a high-power device the shielding rings may be replaced with shielding coils, either individually short-circuited or connected in series with the corresponding main coil but in the opposite sense.

The overall structure is suitably potted with an appropriate potting compound 99 which maintains the structural rigidity of the elements embedded therein and provide an easily handled integral unit for stacking with similar units to build up the overall DC output voltage desired. Each unit has its output leads, for example, from resistors 82 and 83 in FIG. 4 brought to output terminals such as terminals 84 and 85, respectively, for example. The latter terminals may be formed, for example, of conductive paint placed on the external surface of the potting compound 99 as shown most clearly in FIG. 8. Thus, as the deck units are stacked, one on top of another, in an insulative tube (not shown), each positive terminal of one unit contacts the negative terminal of the unit above and each negative terminal contacts the positive terminal of the unit below.

As shown best in FIG. 7, each coil, such as, for example, a secondary coil 44, is connected via leads 94 and 95 (also shown with reference to coil 44b in FIGS. 4 and 5) to the coupling capacitances and the capacitor-rectifier chain 51, mounted peripherally about the shielding coils 93 associated with each corresponding deck. Such elements, of course, are appropriately encased in the potting compound 99. For purposes of clarity they are not shown in FIG. 8 but are indicated in part in FIG. 7.

An example of the dimensions of one particular embodiment of the invention and typical values for the electrical elements therein is described below, particularly with reference to the vector diagram of FIG. 6, in order to provide a typical representation of a practical application of the invention in providing a high voltage source, in this case designed for a relatively light current load. Such dimensions and other values are not to be considered as limiting the scope of the invention and are used only to show how the invention typically might be used.

For example, with reference to FIGS. 7 and 8, each coil is arranged so that the outer diameter thereof is approximately 2.5 inches and the inner diameter thereof is approximately 1.25 inches, the width of each coil being approximately 0.625 inches, and each coil having 160 turns. For a center-to-center separation, designated in FIG. 8 as dimension "d," of approximately 0.75 inches, each coil has a self-inductance L equal to $1.08 \times 10^3$ henry, while the mutual inductance M between the primary coil and secondary coil of a particular deck is $0.486 \times 10^3$ henry.

For a frequency of 100 kHz., the value of the capacitances used in the capacitance coupling networks of each deck are calculated in accordance with Eqs. (1) and (2) as $C_p$=890 pf. and $C_s$=5280 pf. For a peak current of approximately 0.75 amps. the maximum AC power output for each deck, in accordance with Eq. (3), is approximately equal to 216 watts.

The vector diagram of FIG. 6 indicates the amplitude and phase relationships among the various voltages and currents associated with each deck. In the example shown in FIG. 5, the voltage across primary coil 44b is shown as the voltage $E_1$ depicted by vector 100, while the voltage across secondary coil 45a is shown by the voltage $E_2$ depicted by vector 101. The AC voltage output from the coil deck, i.e., the voltage from the point of symmetry 50 to the common point 66 of the coils (as shown in FIG. 5) is designated by the voltage V depicted by vector 102 in FIG. 6. The voltage across each series capacitor 46 and 47 is depicted by vectors 104 and 105 so that the voltage plus the voltage across capacitor 47 represents the voltage across primary coil 44b, while the voltage V plus the voltage across capacitor 46 represents the voltage across secondary coil 44a. The peak currents through each of the coils in the deck are shown by vectors 105 and 16. Vectors 107 and 108 represent the currents in each parallel capacitance branch while the current through the series capacitance branch is represented by vector 109.

The rectifying network associated with each deck can be arranged to have any suitable number of rectifier-multiplier stages as desired for producing the DC voltage output from each deck. In a particular example, in association with the above calculations, the rectifying network may comprise a total of 40 rectifier stages (20 on each side of the point of symmetry), which in accordance with the above calculations would provide a DC voltage output of approximately 37.5 kV. across terminals 84 and 85 in FIG. 5.

In one practical embodiment of the invention, the overall cascade transformer column may include, for example, 8 decks for providing a 300 kV. DC voltage output for a total stack length of only 12 inches, each two-coil deck configuration comprising approximately 1.5 inches in length.

Although the coupling capacitance network between coils in each deck unit is shown as having the particular symmetric configuration of FIGS. 2, 3 and 4, for example, other coupling network configurations can be utilized. Examples of such alternative embodiments are shown in FIGS. 9, 10 and 11 which, for clarity, show the coupling capacitance network and appropriate connections to the rectifier networks involved for a single deck unit or a pair of adjacent deck units, as appropriate.

Figure 9:
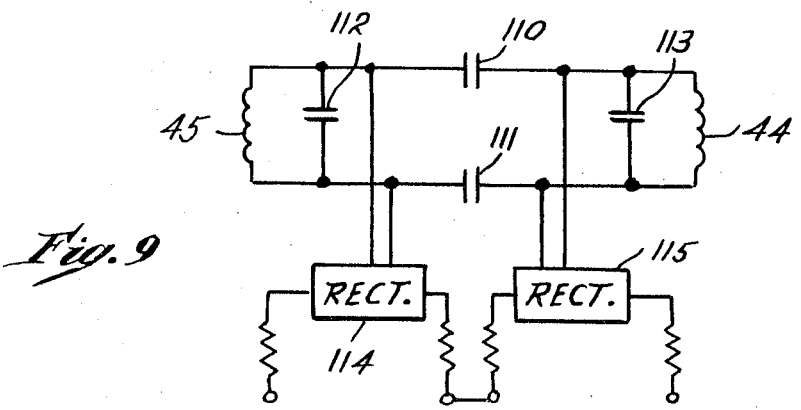
FIG. 9 shows a schematic diagram of an alternate embodiment of the capacitance coupling network and rectifier network configuration depicted in FIGS. 2, 3 and 4.

In FIG. 9, for example, a first series capacitance 110 is connected between a first pair of end points of coils 45 and 44 and a second series connected capacitance 111 is connected to the opposite end points of such coils. Appropriate parallel capacitances 112 and 113 are connected in a manner similar to that shown in the previous figures. Since no available point of symmetry exists in such a configuration, a pair of rectifier units 114 and 115 are connected across each coil as shown, such rectifying units being in themselves connected in series.

Figure 10:
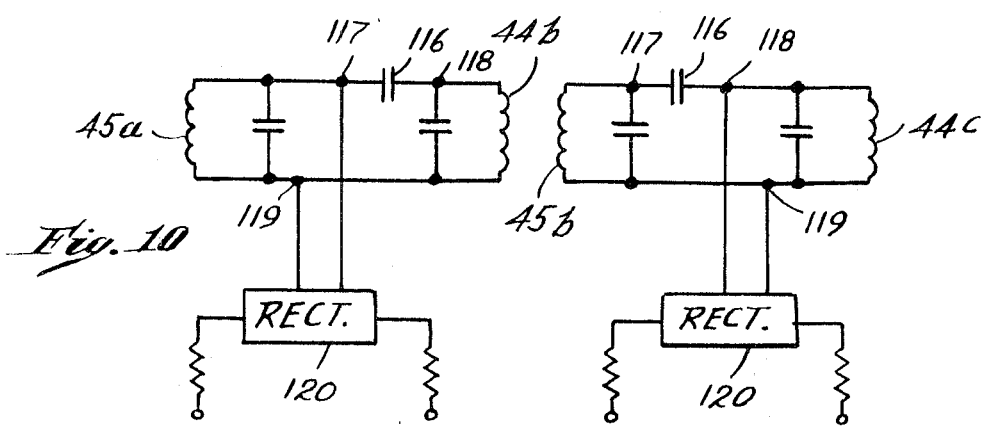
FIG. 10 shows a schematic diagram of another alternate embodiment of such capacitance coupling network and rectifier network configuration.

Another alternate capacitance configuration, shown with reference to an adjacent pair of deck units in FIG. 10, utilizes a single series capacitance 116 connected between the end points 117 and 118 of coils 45 and 44, the other end points of which are connected to a common terminal 119. In such configuration, because no point of symmetry exists, a rectifier unit 120 is connected between point 117 and the common connected point 119 for one deck unit while a rectifier unit 120 is connected between point 118 and common point 119 for the adjacent deck unit. Thus, the rectifier units are alternately connected to one or the other end point along the entire chain of deck units.

Figure 11:
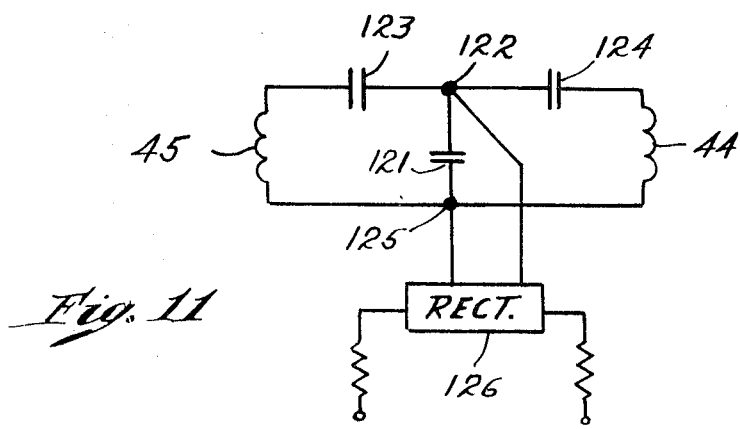
FIG. 11 shows a schematic diagram of still another alternate embodiment of such capacitance coupling network and rectifier network configuration.

Still another alternate embodiment of such capacitance coupling network is shown in FIG. 11 wherein the parallel connected capacitances associated with each coil are substituted by a single parallel connected capacitance 121 connected from a common point 122 of two series connected capacitance 123 and 124 to a common end point 125 of coils 45 and 44. A rectifier unit 126 is then connected to the symmetry points 122 and 125, as shown.

What I claim is:

1. A high voltage generator comprising
a plurality of units mounted adjacent one another, each of said units including
a first coil;
a second coil mounted adjacent said first coil;
a capacitance network coupling said first and second coils, said capacitance network comprising
parallel capacitance means connected in parallel with said coils;
further capacitor means connected in series with said coils, the values of said parallel capacitor means and said further capacitor means being selected to produce resonance conditions; each said coil of each of said units being coupled to a coil of a unit adjacent thereto; rectifying means connected to said coupling capacitance network for producing a rectified voltage;
a source of AC voltage;
an input coil mounted adjacent a first coil of one of said units and coupled to said AC voltage source;
means for adding the rectified voltages from each of said rectifying means to produce a rectified output voltage.

2. A high voltage generator in accordance with claim 1 wherein each of said coils has a nonmagnetic core.

3. A high voltage generator in accordance with claim 1 wherein
said input coil and said one coil of said one unit have a common ferromagnetic core; and
one coil of each of said units and a coil of an adjacent unit have a common ferromagnetic core.

4. A high voltage generator in accordance with claim 3 wherein said ferromagnetic cores each comprise two sections separated by a nonmagnetic gap.

5. A high voltage generator in accordance with claim 2 wherein
said coils have one pair of commonly connected end points;
said further capacitance means comprises first and second capacitors having a common junction; and
said rectifying means is connected from said common junction to said commonly connected end points.

6. A high voltage generator in accordance with claim 5 wherein said parallel capacitor means have capacitance values which are substantially equal to each other and wherein said first and said second capacitors of said further capacitance means have capacitance values which are substantially equal to each other.

7. A high voltage generator in accordance with claim 1 wherein said input coil is coupled to said AC voltage source through an input capacitance network.

8. A high voltage generator in accordance with claim 7 wherein
said input capacitance network comprises
an input capacitor connected in parallel with said input coil means; and
further input capacitance means connected in series with said input coil means.

9. A high voltage generator in accordance with claim 1 wherein
said units are formed as integral decks, said deck units being successively stacked adjacent one another so that said coils lie along a common axis;
the elements of said rectifying means are mounted peripherally about said coil members; and
shielding means are mounted between said coil members and the elements of said rectifying means.

10. A high voltage generator in accordance with claim 1 wherein said further capacitance means comprises
a first capacitor connected between one pair of end points of said coils;
a second capacitor connected between the opposite pair of end points of said coils; and
said rectifying means comprises a pair of rectifier networks, one connected in parallel with said first coil and the other connected in parallel with said second coil.

11. A high voltage generator in accordance with claim 1 wherein said further capacitance means comprises a single capacitance connected in series with said coils; and
a first plurality of rectifier networks are connected in parallel with each of said first coils of said units in alternati ıg ones of said units; and
a second plurality of rectifier networks are connected in parallel with each of said second coils of said units in intervening ones of said units.

12. A high voltage generator in accordance with claim 5 wherein said parallel capacitance means comprises a single capacitance connected from said common junction to said commonly connected end points.